Sept. 12, 1961  A. T. SCHMIDT  2,999,923
FLASHER LIGHT CASING CONSTRUCTION
Filed July 20, 1959
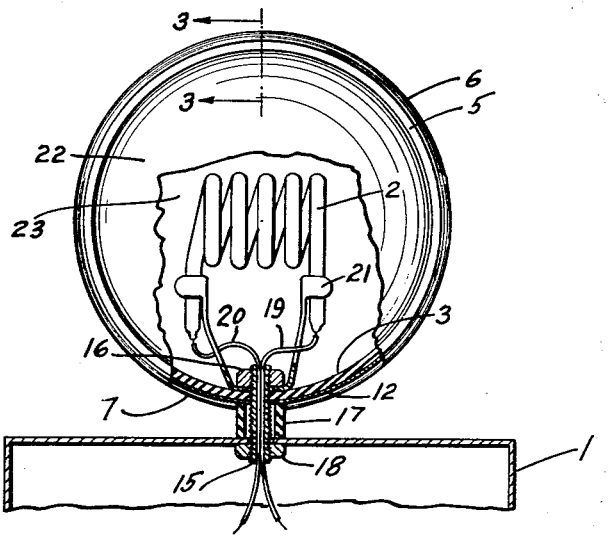
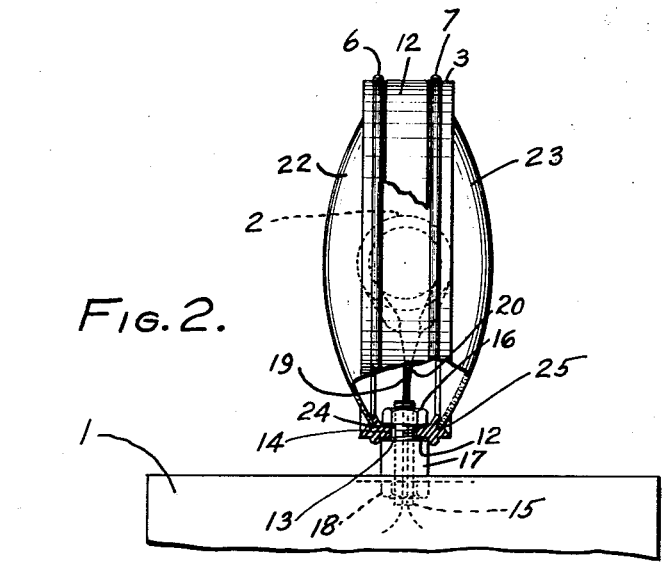
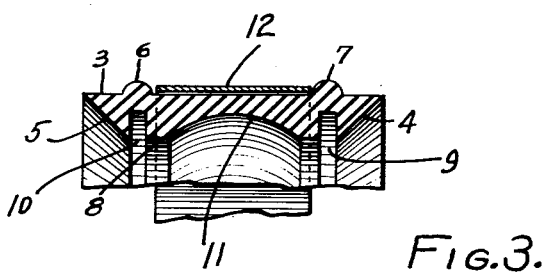
INVENTOR,
ALFRED T. SCHMIDT;
BY
ATTORNEY 2,999,923
FLASHER LIGHT CASING CONSTRUCTION
Alfred T. Schmidt, 5547 Vineland,
North Hollywood, Calif.
Filed July 20, 1959, Ser. No. 828,372
3 Claims. (Cl. 240—11.4)

The present invention relates to a casing construction for use in flasher light assemblies, an object of the invention being to provide a construction which is shock resistant permitting easy assembly of the parts of the casing including the lens; which is inexpensive in cost to manufacture and generally superior to casing constructions now known to the inventor.

At the present time the construction generally employed for flasher light casings is a cast matallic one having screws for engagement with the casing for holding the lens in position for service including metallic rings usually held by screws secured to the casing as well as other elements which render the cost of producing such a type of flasher casing quite expensive. Flasher lights are quite often the object of petty thievery both by adults and children and the loss thereof imposes a large expense for replacement.

With my invention I have produced a casing which allows ready assembly of the various parts entering into a flasher light which is inexpensive and which does not entail a great financial loss if the flasher light is stolen.

In the drawing:

FIGURE 1 is a fragmentary, partially sectional view of a flasher light incorporating the invention;

FIGURE 2 is a fragmentary side elevation, partly in section, of the flasher light shown in FIGURE 1; and FIGURE 3 is an enlarged fragmentary cross-sectional view on the line 3—3 of FIGURE 1.

Referring now to the drawing, 1 is a housing which is generally provided and which is adapted to contain flasher mechanism such as a flasher button or other flasher device together with a suitable battery adapted to energize a flasher light such as the neon tube shown at 2. The neon tube is generally enclosed within a suitable casing to protect the same against breakage. This casing which forms a part of the present invention includes a rubber or rubber composition extrusion forming the circular side wall 3 of the casing which is substantially an isosceles trapezoid in cross-section. This extrusion is provided with inwardly tapered or flared end walls or legs 4 and 5, the external surface or base of said wall 3 being provided with a pair of spaced apart annular beads 6 and 7 while the inner wall or base 8 is formed with a pair of annular grooves 9 and 10, which in the present instance lie directly beneath the beaded areas 6 and 7. While the thickness of the side wall may be uniform, I have in the present instance provided the same with an annular concavity 11 intermediate the annular grooves 9 and 10. This gives the wall 3 a degree of flexibility to bending, particularly transverse bending. Adapted to surround the wall 3 and between beads 6 and 7 is a metal ring 12. Both the metal ring 12 and the member 3 are provided with transverse aligned bores 13 and 14 for passage therethrough of a tubular bolt 15. A nut 16 is threaded to said bolt within wall 3, as shown in FIGURE 2. This bolt is attached to the top wall of the housing 1, there being a compressible washer 17 surrounding the tubular bolt between the metal ring 12 and the outer surface of the housing, with a nut 18 secured to said tubular bolt within the housing. Electrodes 19 and 20, secured to ends of the neon tube 2, are passed through the tubular bolt into the housing 1. I may provide some form of support for the neon tube such as illustrated at 21 in FIGURE 1. The type of support for the neon tube forms no part of the invention. Lenses are provided at 22 and 23 and said lenses are adapted to have their circular edges received within the annular grooves 9 and 10 as shown in FIGURE 2 at 24 and 25. These lenses are easily inserted in position by pressing inwardly thereon, the lenses sliding against the tapered surfaces 4 and 5 to flex the wall 3 sufficiently to permit the edge of each lens to be received within its respective groove. This construction results in one that is waterproof, shockproof and completely eliminates the necessity of screws and bolts with easy removal of the lenses without the use of tools.

The operation, uses, and advantages of the invention are as follows:

The extrusion 3 may be cut to length to accommodate different lens diameter, with the ends brought into abutment when the band 12 encircles the extrusion 3. Each lens is pressed inwardly of the tapered or flared surfaces 4 and 5, and snaps into position within grooves 9 and 10 after securing the assembly to the housing 1 by the hollow bolt 15. Thus, in place of many elements to be secured by bolts and screws, a single hollow bolt secures the assembly to the housing 1.

I claim:

1. In flasher light casing construction, an elongated flexible strip of substantially isosceles trapezoidal cross-section, providing two bases of different dimension joined by legs, the base of greater dimension facing outwardly and the base of lesser dimension facing inwardly, said flexible strip being formed into an annulus to provide a side wall for said flasher light casing, a ring engaging the outwardly facing base for maintaining the flexible member in annular form, said flexible strip being provided with a pair of spaced apart substantially parallel annular grooves on the base of lesser dimension, and the legs of said strip forming flared end walls leading from the outer base to the inner base and said annular grooves, lenses having a diameter substantially equal to the diameter of the annular grooves, the lenses being adapted to have press fit engagement with the flared end walls to expand the said strip for reception of the edges of said lenses within the annular grooves, and a neon tube confined within the flasher light casing and provided with electrodes passed externally of the casing.

2. The device as set forth in claim 1, and means passed between the flexible strip and said ring for holding the parts in working relationship.

3. The device as set forth in claim 1, there being a tubular bolt, housing the neon tube electrodes, passed transversely through flexible strip and said ring and means carried by said tubular bolt for locking said ring and said flexible strip in working relationship.

References Cited in the file of this patent

UNITED STATES PATENTS

| | | |
|---|---|---|
| 1,401,988 | Knapp | Jan. 3, 1922 |
| 1,447,589 | Leech et al. | Mar. 6, 1923 |
| 1,486,357 | Sandbrook | Mar. 11, 1924 |
| 2,739,224 | Knapp | Mar. 20, 1956 |
| 2,831,964 | Diedring | Apr. 22, 1958 |

FOREIGN PATENTS

| | | |
|---|---|---|
| 166,274 | Australia | Dec. 8, 1955 |
| 782,121 | Great Britain | Sept. 4, 1957 |